Sept. 28, 1965 G. M. DUNHAM ETAL 3,209,343
MULTI-STATION GAS DETECTING APPARATUS
Filed Dec. 11, 1961 7 Sheets-Sheet 1

FIG. 1

INVENTORS
Glen M. Dunham
Gerald L. Moore

BY Bertram H. Mann
ATTORNEY

INVENTORS
Glen M. Dunham
Gerald L. Moore
BY
Bertram H. Mann
ATTORNEY

Sept. 28, 1965   G. M. DUNHAM ETAL   3,209,343
MULTI-STATION GAS DETECTING APPARATUS
Filed Dec. 11, 1961   7 Sheets-Sheet 7

INVENTORS
Glen M. Dunham
Gerald L. Moore

BY
ATTORNEY ic Office 3,209,343
Patented Sept. 28, 1965

3,209,343
MULTI-STATION GAS DETECTING APPARATUS
Glen M. Dunham and Gerald L. Moore, Houston, Tex.,
assignors to National Lead Company, New York, N.Y.,
a corporation of New Jersey
Filed Dec. 11, 1961, Ser. No. 158,211
9 Claims. (Cl. 340—237)

This invention relates to contaminant gas detection apparatus and consists particularly in a fully automatic and reliable gas plant safety detection system.

Previous gas plant safety devices, intended to give an alarm when the concentration of escaped gas in the ambient atmosphere reaches dangerous proportions, have not been fully satisfactory principally because they have not embodied means to prevent costly false alarms. It may cost as much as a hundred dollars a minute to shut down a gas plant for the purpose of locating and correcting the offending gas leak. Consequently, such economic loss caused for instance by faulty detection apparatus cannot be tolerated.

Consequently, an important object of the present invention is to provide a gas plant safety detection system with adequate means to signal dangerous gas conditions, while embodying test means to prevent the giving of false alarms.

Another object is to provide gas plant safety apparatus which periodically monitors whatever zones need frequent inspection and provide desired signals indicating a dangerous condition and also the location of the condition.

Another object is to provide such a system which requires a minimum of maintenance.

Another object is to provide a gas plant safety detection system, including means to test the detection apparatus each time it is conditioned for giving an alarm signal, but before such signal is actually given.

Another object is to provide a gas plant safety detection system with means for indicating malfunction in any part of the system and for preventing the causing of an alarm signal due to such malfunction.

Our improved apparatus for attaining the above objects consists generally of search means including a step by step selector valve which periodically samples the atmosphere at any number of selected zones to be monitored and feeds the samples to gas sensitive filaments of known type. These filaments are connected into a Wheatstone bridge arrangement, which is normally balanced, in such a way that subjecting the filaments to a combustible gas tends to unbalance the bridge and transmit a signal to a warning or alarm meter. Such stimulation of the gas sensitive device (bridge and meter), during the "search" period brings into action equipment for testing the integrity or operativeness of the sensing device and making corrections, if necessary. First, the bridge in circuit is transferred to a "zero" meter which registers any departure of the bridge in circuit from balanced condition. Any such departure is corrected, if possible, by a "zero servo" mechanism, but if the malfunction cannot be corrected, transfers a spare bridge, including reserve filaments to the test circuit. Thereafter, the "zeroing" and following procedure is performed on the spare bridge.

If the first or spare bridge is properly "zeroed" it is then subjected to a sample of known test gas and its response again applied to the "alarm" meter. If the response of the latter meter is improper, the filaments in circuit are subjected to an increased voltage tending to burn off any coating which may be affecting the filament sensitivity. The normal gas test is again run. If the filament is still insufficiently sensitive, the spare bridge is transferred to the circuit and the zeroing and known gas tests again run.

When the sensitivity of the filament in circuit has been verified, as described, the apparatus is shifted to a third or "alarm" condition in which monitoring of the various stations continues. Now if a gas show is again encountered, the resulting bias of the bridge in circuit applied to the alarm meter gives an alarm indicating the place of the gas show. Other safety devices are provided for indicating malfunction in the motor operating the selector valve, in the compressor for drawing test samples from the monitored stations, in the individual monitoring lines, and in the various power sources. Finally, means are provided for cutting into the apparatus various spare parts in place of parts found to function improperly.

In the ensuing description, various relays, usually, are designated by reference letters and their pole, normally open, and normally closed contacts by numerals 1, 2, 3, etc. Thus, the pole contact of relay A may be designated A–1 pole.

Figure 1:
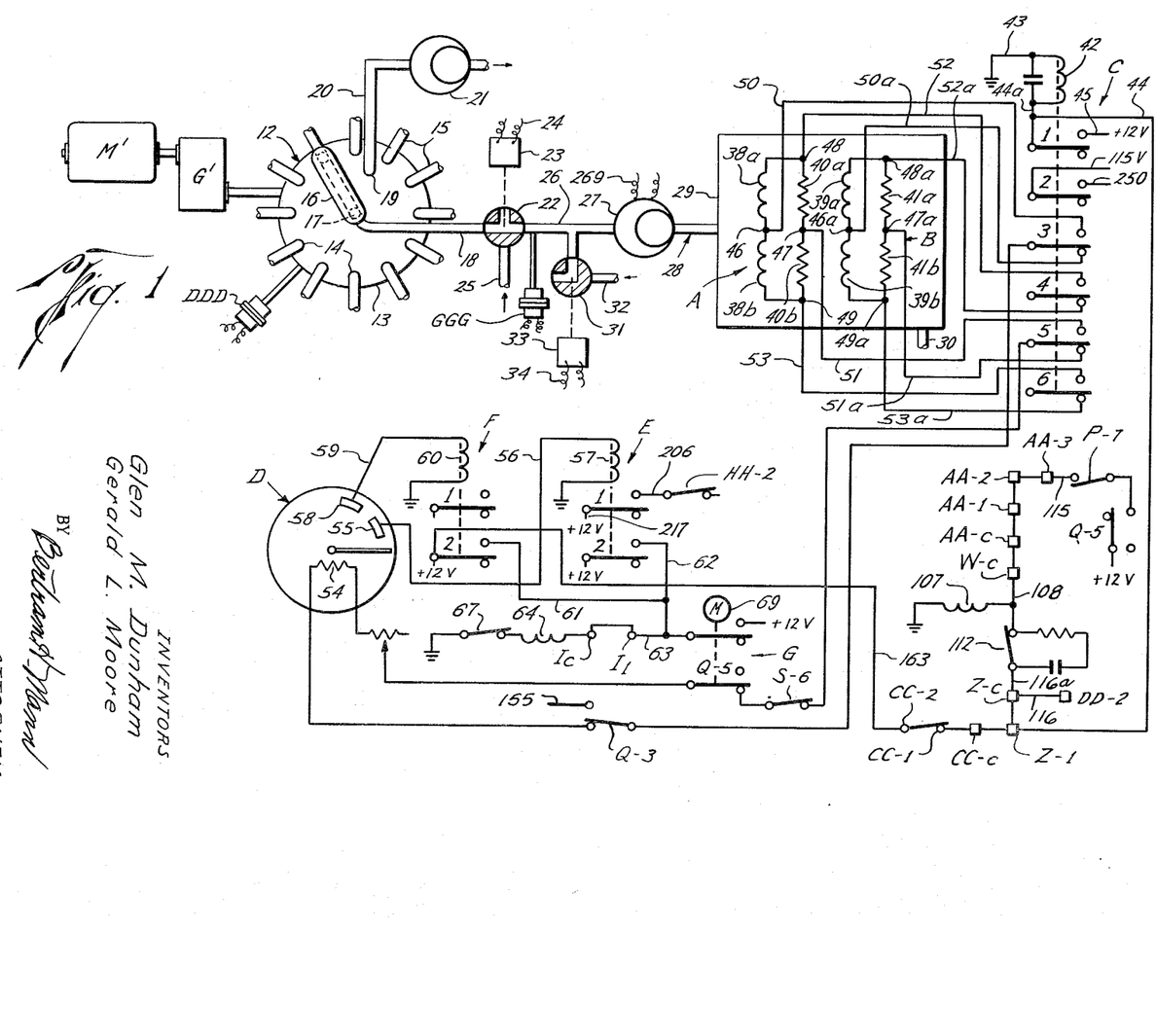
FIG. 1 is a schematic representation of the monitoring selector valve and its operating means, the two bridges with means to interchange the same in circuit, the alarm meter, and the low and high gas relays actuated thereby.

FIG. 1 is a general view, largely schematic, showing certain elements of the gas collecting and sensing system. The selector valve, generally designated 12, consists of a circular casing 13 forming a flat, cylindrical chamber having a plurality of ports 14 in the wall thereof from which radiate a multiplicity of tubes 15 leading to various areas, as in the vicinity of gas pumping apparatus, which are to be monitored for indications of gas leaks. A rotor 16 is centrally pivoted in the casing and serves to connect ports 14 sequentially with a central port 17 to which is connected a conduit 18. The rotor is operated step by step by a motor M′ and Geneva motion transmission G′. Another discharge port 19 within casing 13 is connected by means of tubing 20 to a pump 21 which serves to maintain a constant suction on casing 13 and the collecting lines 15 when clear of the rotor, so that atmosphere from their individual monitored zones is constantly drawn through the casing. Vacuum sensitive switch devices DDD and GGG also are connected, respectively, to casing 13 and a sample conduit 26, as will be explained.

Conduit 18 leads to a three-way valve 22 provided with an actuating solenoid 23 having control wiring 24. A fresh air inlet 25 connects with one side of valve 22 and conduit 26 connects with the valve opposite conduit 18. Conduit 26 connects valve 22 to a compressor 27 which draws fluid from this conduit and delivers it through a conduit 28 to a casing 29 from which the pumped fluid is discharged to atmosphere through an exhaust pipe 30. A two-way valve 31 connects conduit 26 with a tube 32 which leads from a source of known test gas. Valve 31 has an actuating solenoid 33 with control wiring 34.

Within casing 29 there are mounted two pairs of catalytic gas sensing filaments 38a and 38b and 39a and 39b, and resistances 40a and 40b and 41a and 41b connected as shown to form two Wheatstone bridges, generally designated A and B. The bridges are wired as shown, respectively, to the normally open and closed contacts C–3, C–4, C–5 and C–6 of a Filament Change relay C. The solenoid 42 of relay C is connected on one side to ground at 43 and on the other side is tied by wire 44 to the pole of relay contact C–1. The normally open C–1 contact is connected to a power source 45 so that relay C will be self-holding.

The corner terminals 46–49, inclusive, are connected, respectively, by wires 50–53 to the normally open contacts C–3, C–4, C–5, and C–6 of Filament Change relay C. Similarly, the corner terminals 46a–49a, inclusive of bridge B, are connected, respectively, by wires 50a–53a, inclusive, to the normally closed contacts C–3, C–4, C–5, and C–6 of relay C. The poles of relay contacts C–3 and C–5 are connected through various other relay contacts, as will be explained, to the actuating coil 54 of a voltage registering meter D, called the "Alarm" Meter. The low voltage contact 55 of this meter is connected by a wire 56 to the coil 57 of a Low Gas Relay E. A higher voltage contact 58 of the alarm meter is connected by a wire 59 to the coil 60 of a High Gas relay F. In actual practice, contact energizing and clamping devices are provided, but these are not necessary for an understanding of the invention and are omitted. Normally open contacts F–2 and E–2 of relays F and E are connected by wires 61, 62, and 63 to the actuating coil 64 of an Operation Selector switch H (FIG. 2).

Figure 2:
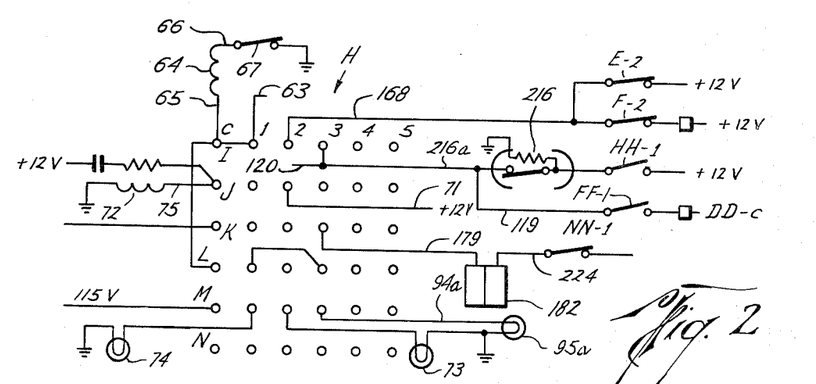
FIG. 2 shows schematically the multiple contact stepper switch, called Operation Selector, which determines the "search," "test," and "alarm" conditioning of the apparatus.

Switch H is a rotary, multi-deck or wafer switch having contacts, as represented in FIG. 2. For convenience the stacked wafers are designated from, top to bottom, I, J, K, L, M and N, and rows of contacts designated from left to right as c (common) and 1–5, inclusive. Actuating coil 64 of switch H is powered from its own contact I–c through wires 65 and 66, the latter breaking through a normally closed interrupter switch 67 whereby circuit wire 66 is automatically opened shortly after coil 64 is energized to limit the movement of the switch to one step at a time.

Also shown in FIG. 1 is a two-pole switch G, the contacts of which are closed every twenty-four hours by a timing motor 69. Thus a signal from alarm meter D, indicating unbalance of the bridge A or B in circuit, possibly due to exposure of one of the filaments 38a, 38b, 39a, 39b to gas, or from the twenty-four hour timer will cause rotary switch H to shift from its normal or "search" position 1 to its "test" position 2 in which all contacts in row 2 will be connected to their corresponding "c" contacts.

*Test position*

Figure 3:
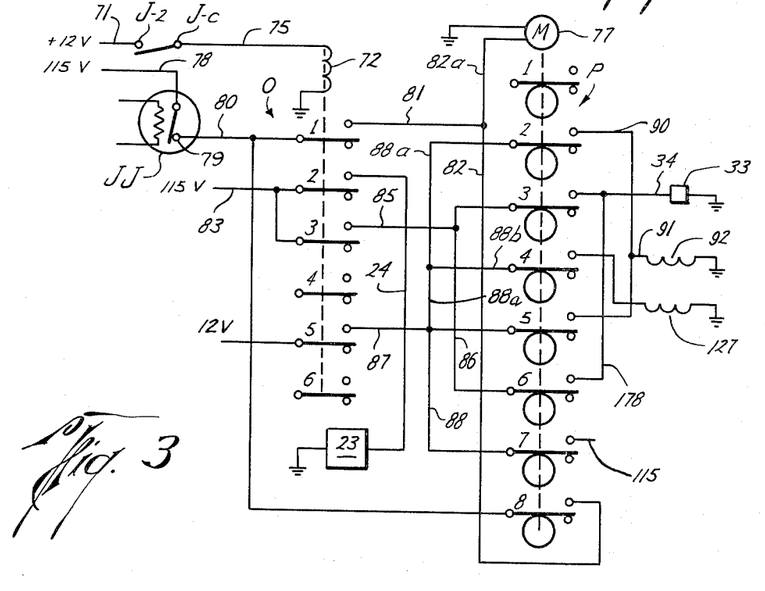
FIG. 3 shows schematically the test programing cams and controls therefor.

In the "test" position of rotary Operation Selector switch H, power will be directed from a supply 71 through contacts J–2 and J–c of switch H and a wire 75 to the actuating coil 72 of a Program Motor relay 0 (FIGS. 2 and 3). Power also will be directed to a "test" indicator lamp 73, through contact M–2 of switch H (FIG. 2) and removed from "normal" indicator lamp 74 connected to contact M–1 of switch H.

Energization of Program Motor relay coil 72 (FIG. 3) acts through a wire 78, the normally closed contacts 79 of a thermal delay switch JJ, wire 80, normally open relay contacts 0–1, and wires 81 and 82a to apply 115 volt A.C. to a motor 77 which rotates a series of cams, as schematically represented, which in turn serially actuate cam switches P–1–P–8, inclusive. Normally open contact 0–2 of relay 0 now applies energy from a source 83 through a wire 24 to previously mentioned solenoid 23 which shifts three-way valve 22 to cut off the selector valve 12 from filament casing 29 and introduce a flushing charge of fresh air. Energization of relay 0, through normally open contact 0–3, further powers cam switch pole contacts P–3 and P–6 through wires 85 and 86, and contact 0–5 power cam switch pole contacts P–2, P–4, P–5, and P–7 through wires 87, 88, 88a, and 88b.

Figure 4:
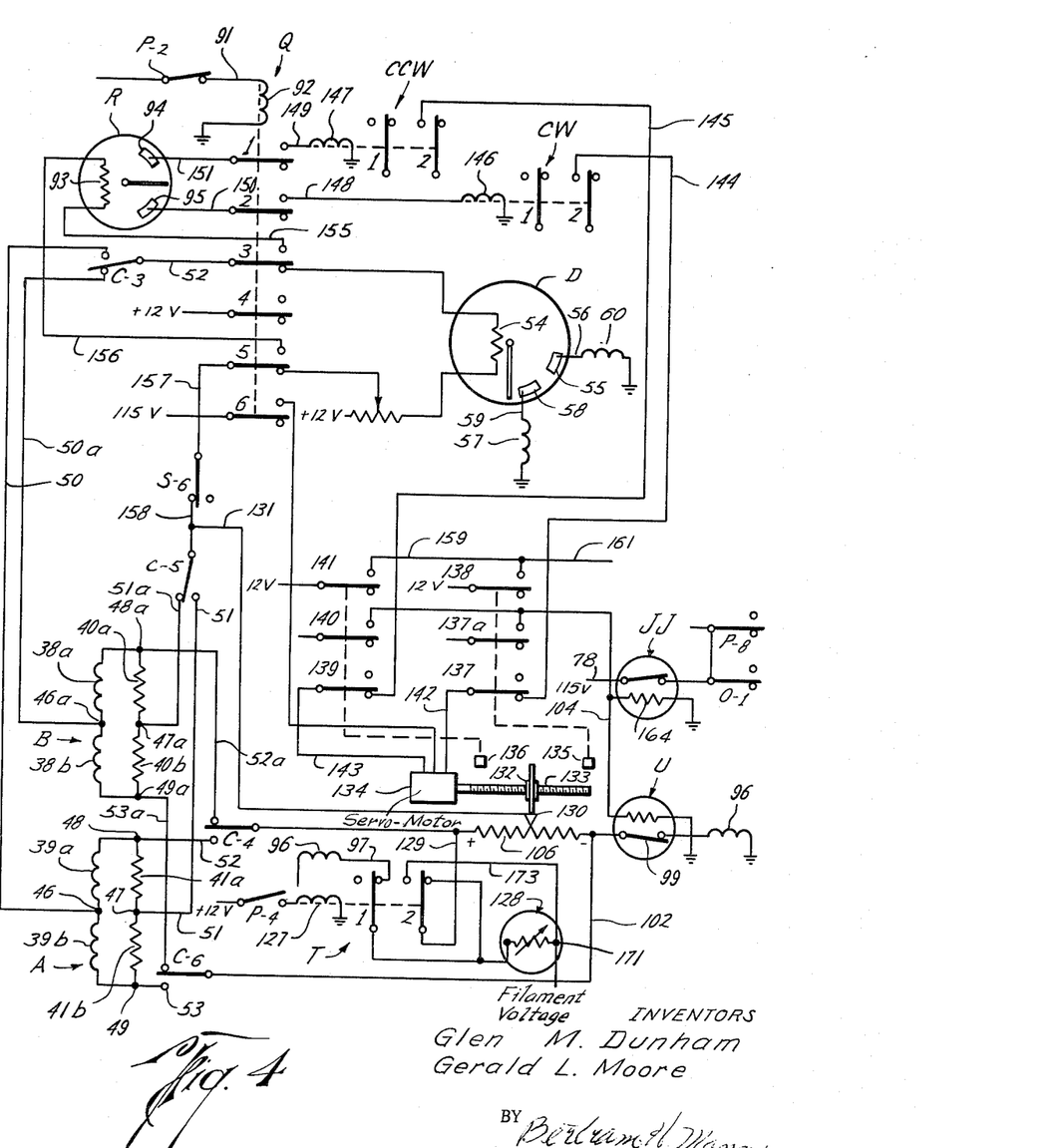
FIG. 4 shows schematically the means for transferring the bridge in circuit from the "alarm" meter to the "zero" meter and the "zero servo" means for attempting to place the bridge in circuit in normal balanced condition.

The closing of cam switch P–2, acts through wires 90 and 91 to energize the solenoid 92 of a Meter Change relay Q represented in FIG. 4. The latter figure also shows the corner terminals of bridges A and B connected alternately through contacts Q–3 and Q–5 of relay Q to the actuating coil 54 of alarm meter D and actuating coil 93 of a Zero meter R for registering departure from zero potential applied thereto. Thus, energizing of meter change relay Q switches the gas sensing bridges to the zero meter. Zero meter R has output contacts 94 and 95 for registering, respectively, negative and positive potentials. The means customarily provided for powering and clamping the "zero" meter output contacts are not shown.

Figure 5:
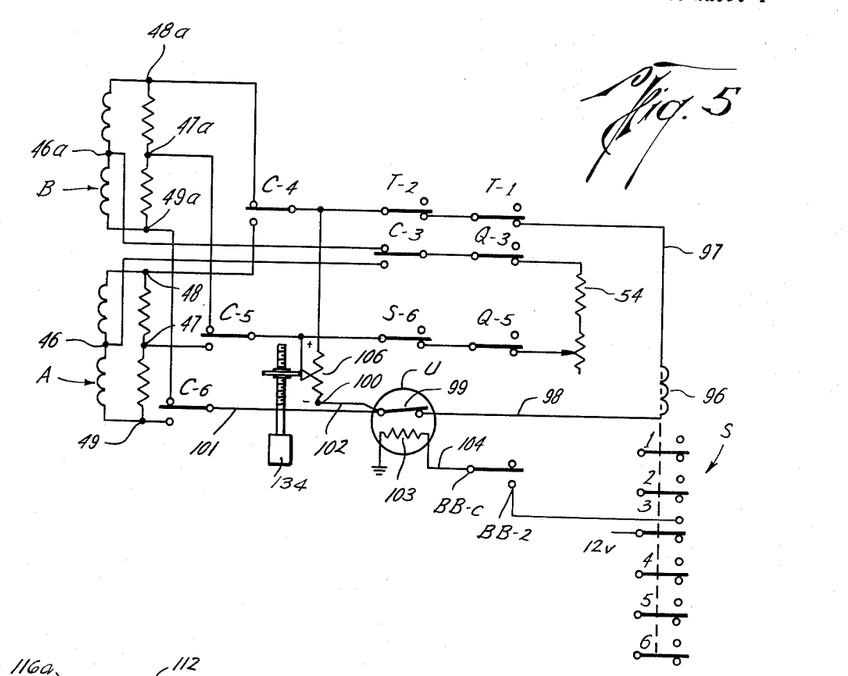
FIG. 5 additionally illustrates the "zero servo" mechanism and also the relay which senses a burned out condition of the bridge in circuit.

FIG. 5 illustrates a Filament Burnout sensing relay S whose actuating solenoid 96 is connected by wires 97 and 98, respectively, through filament change relay contacts C–4 and C–6 and various other relay contacts and switches, as shown, to corner terminals 48 and 49 of bridge A or 48a and 49a of bridge B, depending on the position of Filament Change relay C. Wire 98 also breaks through the normally closed contacts 99 of a thermal delay switch U and connects by a wire 101 to the C–6 pole contact of relay C and by a parallel wire 102 to the negative side of a bridge balancing potentiometer coil 106. The heater coil 103 of switch U may be energized by means of a wire 104 leading to contacts BB–c of a second rotary stepping switch V shown in FIG. 6, thence by a wire 105 from switch contact BB–2 to normally open contact S–3 of the Burnout Sensing relay S. Switch V has eight wafers or decks designated W, X, Y, Z, AA, BB, CC and DD, and three positions indicated by columns of contacts numbered 1, 2, and 3, and c (common). Thus, when stepping switch V shifts to position 2 with relay S energized due to a bridge unbalance, heater coil 103 will be energized and, after a few seconds, will open switch contacts 99 to remove energy from coil 96 of Burnout Sensing relay S.

Figure 6:
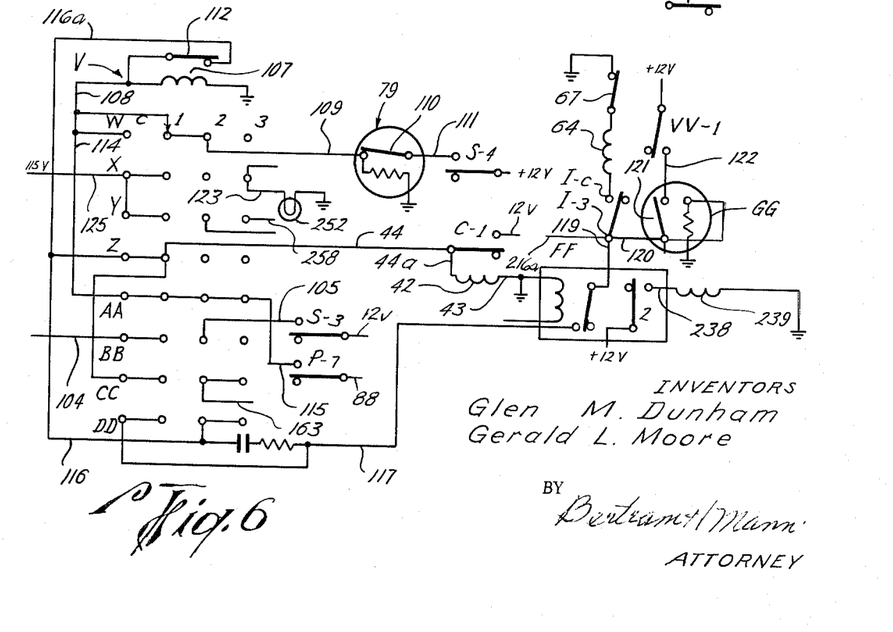
FIG. 6 illustrates another multiple contact stepper-type switch or relay together with the stabilizing relay and other controls associated with this stepper switch.

The actuating coil 107 of stepping switch V may be energized to shift the switch from position 1 to position 2 by means of a wire 108 leading to contact W–c and through W–1 and W–2 to a wire 109 and to normally closed contact 110 of self-heating type delay switch 79. Switch 79 connects by a wire 111 to normally open contact S–4 of Burnout Sensing relay S (FIG. 5). Coil 107 of switch V also may be energized through wire 108 to contact AA–c, thence to either AA–1, AA–2, or AA–3, and by wire 115 to the normally closed contact of P–7.

Thus if either contacts P–7 or S–4 are closed, then 12 volt power is fed to energize coil 107 (FIG. 6). When the signal from either P–7 or S–4 is removed, then the coil 107 of switch V allows the switch contact W–c to move to position 2. The same description applies if switch V is in position 2. When switch V is in position 3, however, power from S–4 does not have any effect upon coil 107.

Stepper switch V, also, may be shifted to position 2 by means of a wire 116a from contact Z–c through an automatic interrupter switch 112, thence through coil 107 to ground. Contact Z–1, tied to Z–c, is connected by a wire 44 to pole contact C–1 of Filament Change relay C so that energy will be supplied to the stepper switch coil 107 when relay C is energized to cut in the spare filament. Interrupter 112 promptly breaks this circuit to limit the motion of switch V to one step.

Figure 9:
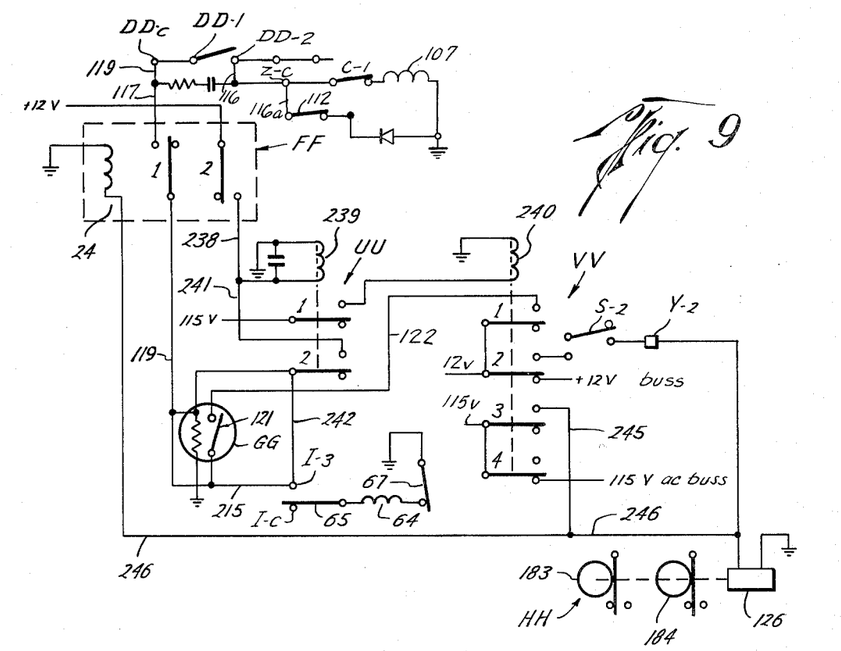
FIG. 9 shows schematically the power control and regulation parts, and the manual reset switch and associated parts.

Switch V may be advanced from position 2 or 3 to position 1 manually by means of a circuit including switch 112, wires 116a and 116, contact DD–2 tied to DD–3, contact DD–c, a wire 117 leading to pole contact FF–1 of a Manual Reset switch FF, a wire 119 leading from normally open contact FF–1 to contact I–3 of the Operation Selector switch H, a wire 120 leading through the normally open contacts 121 of a self-heating thermal switch GG, and a wire 122 leading to the normally open contacts VV–1 of a four-pole Reset relay VV (FIG. 9).

With further reference to stepper switch V (FIG. 6), its contact X–3 is connected by a wire 123 to a lamp 252 which receives power from source 125 tied to contact X–c to indicate nonfunctioning of the spare set of filaments in bridge A. Other wiring of switch V will appear as the description proceeds.

FIG. 4 also illustrates a stabilizer relay T whose actuating coil 127 may be energized through Program Cam switch contact P–4 (FIG. 3) in case the test procedure to be explained shows the particular filaments in circuit deficient in sensitivity. Relay T has two sets of contacts, as shown. Contacts T–1 prevent energization of coil 96 of Burnout Sensing relay S during the stabilizing procedure with relay coil 127 energized. Contacts T–2 serve to bypass the filament voltage regulator 128 to apply full voltage from the power source for burning off corrosion or other coatings on the filaments, as will be further explained. Pole contact T–2 is connected to bridge corner 48 or 48a by means of a wire 129, and normally closed contact T–2 directs regulated voltage to the bridge. When Stabilizer relay coil 127 is energized, the regulator is bypassed.

FIG. 4, further, shows potentiometer coil 106 provided with a voltage divider contact 130 which is connected by a wire 131 to pole contact C–5 of the Filament Change relay, thence to either bridge corner 47 or 47a. Contact 130 is a slider and is mounted on a worm gear 132 on a worm 133 operated by a zero servo motor 134 through suitable gearing. Limit devices 135 and 136 are positioned to be engaged by worm gear 132 at the extremes, respectively, of clockwise and counterclockwise movement of the worm for utilizing the coil 106 in attempting to obtain zero output balance of the connected bridge. Clockwise limit device 135 mechanically actuates three sets of limit switch contacts 137, 137a, and 138. Counter clockwise limit device 136 actuates three sets of limit switches 139, 140 and 141. The poles of limit switch contacts 137 and 139 are connected by wires 142 and 143 to servo motor 134. The normally closed contacts 137 and 139 are connected by wires 144 and 145 to normally open contacts CW–2 and CCW–2 of relays CW and CCW. The coils 146 and 147 of relays CW and CCW are connected by wires 148 and 149, normally open contacts Q–2 and Q–1 of Meter Change relay Q, and wires 150 and 151, respectively, to the contacts 94 and 95 of zero potential testing meter R which senses departure from zero output balance of the filament bridge in circuit.

The actuating coil 93 of Zero meter R (FIG. 4) is connected to bridge corner terminals 46, 46a, 47, 47a as follows: a wire 155 leads through normally open contact Q–3 of the Meter Change relay Q and contacts C–3 of the Filament Change relay C, thence by wires 50 and 50a to either of the bridge corner terminals 46 or 46a. The other side of Zero meter coil 93 is connected by a wire 156, normally open contact Q–5, of the Meter Change relay, a wire 157, normally closed contact S–6 of burnout relay S, a wire 158, contacts C–5 of the Filament Change relay C, and wires 51 and 51a to bridge corner terminals 47 and 47a. Thus, any departure of the needle of Zero meter R from its centered position will produce a current impulse through either of contacts 94 or 95 and thereby cause operation of servo motor 134 and worm 133 in the direction tending to balance the bridge in circuit. An advantage of this circuit is that the bridges themselves are not adversely affected by variable resistance of internal switches and relay contacts, since the balancing potentiometer is in an additional, high resistance, parallel circuit.

Figure 7:
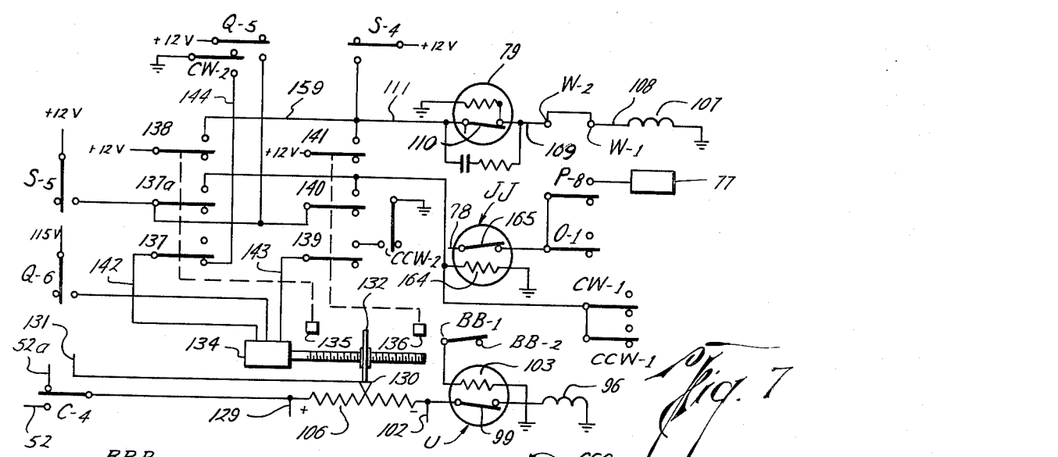
FIG. 7 is another representation of the "zero servo" mechanism and associated parts, including the program cam operating motor.

In case the affected bridge is not zeroed within the effective range of potentiometer 106, when worm gear 132 strikes either of the stops 135 or 136, the corresponding sets of limit switches will be actuated. With reference to FIG. 7, closing of either of normally open contacts 138 or 141, tied together by a wire 159, will apply current through a wire 111, normally closed contacts 110 of self-heating thermal switch 79, wire 109, tied contacts W–2, W–1, and W–c of switch relay V, and wire 108 to coil 107 (also see FIG. 6) which will cause switch V to move to position 2 where it will stop due to the prompt opening of thermal switch contacts 110. In position 2 of stepper switch V (see FIGS. 1 and 6), a powered wire 163 leads from High Gas relay pole contact F–2, through contacts CC–2 and CC–c of switch V, the latter being tied to contact Z–1, thence by wire 44 to pole contact C–1 of the Filament Change relay C and wire 44a to coil 42 of relay C. Thus, actuation of either set of limit switches by zero servo worm gear 132 will cause shifting of the spare bridge into circuit.

Closing of limit contacts 137a or 140 (FIGS. 3, 4, and 7) applies current to the heating coil 164 of thermal switch JJ. This opens contacts 165 in the powering circuit for Program motor 77. Motor 77, therefore stops. If proper zeroing of the bridge in circuit is thereafter achieved, both relays CW and CCW will return to normal, heater coil 164 will be de-energized, and contacts 165 will close to restart Program motor 77.

*Sensitivity test*

Now, assuming proper zeroing of the original or spare bridge in circuit, motor 77 continues to run, cam switch m–2 now opens (FIG. 3) to de-energize Meter Change relay Q and return alarm meter D to the circuit (FIG. 4). Next, cam switch P–3 closes to energize test gas valve solenoid 33 through wire 34. This feeds a quantity of known test gas to the filaments in circuit. If the alarm meter is properly sensitive, either Low Gas relay E or High Gas relay F will pick up through alarm meter contact 55 or 58 and apply current through wire 168 (FIG. 2) to winding 64 whereupon Operation Selector relay H will shift to position 3 (alarm position) as will be explained.

However, in case the alarm meter D should register improper sensitivity of the bridge in circuit, the Program motor 77 continues to operate, cam switch P–3 opens closing test gas valve 31, and cam switch P–4 closes to energize the coil 127 of the Stabilizer relay T (FIGS. 3 and 6). FIG. 5 shows that opening of Stabilizer relay contacts T–1 de-energizes a wire 97 leading to coil 96 of Burnout relay S. Closing of normally open relay contact T–2 (FIG. 4) directs the full voltage of the power supply from supply terminal 171 of filament voltage regulator tube 128 through wires 173 and 129 to either of wires 52 or 52a leading to the bridges, according to the position of relay contact C-4. Then, Program Cam switch P-4 opens and cam switch P-5 closes. Switch P-5, cam switch to cam switch performs the same function as P2, namely (FIG. 3), to energize coil 92 of the Meter Change relay Q and, thereby, cut in the Zero meter R, cut out the alarm meter D, and energize solenoid 23 to open fresh air valve 22, while stopping the supply of samples through conduit 18.

If proper zeroing of the spare bridge is now achieved, as previously described, by zero servo elements 134, 132, 106, etc. (FIGS. 4 and 7), and neither limit switch device 135 nor 136 is actuated, Program Cam switch P-5 is now opened to de-energize fresh air solenoid 23 and cam switch P-6 is closed. Switch P-6, being tied by wire 178 to switch P-3 (FIG. 3), energizes solenoid 33 through wires 178 and 34 to again open test gas valve 31. Opening of cam switch m-5 also de-energizes coil 92 of Meter Change relay Q which reshifts the bridge in circuit to Alarm Meter D (FIG. 4). If meter D registers adequate sensitivity of the filaments in circuit, a signal from normally open point E-2 or F-2 of the low or high gas relays (FIG. 1) applied through wire 61 and 63 (FIGS. 1 and 2) and contact I-1 and I-c of Operation Selecter switch H, energizes solenoid 64 to shift switch H to its third or "alarm" position. This disconnects energizing wire 75 (FIGS. 2 and 3) from its direct current powering source wire 71, dropping Program Motor relay O and de-energizing cam switch pole contacts P-2 through P-7. However, cam switch P-8 has previously closed so that motor 77 continues the program cam movement to normal position, wherein cam switch P-8 opens and motor 77 stops.

"Alarm" cycle

Now, in the "alarm" position of Operator Selector switch H (FIG. 2), all of its contacts I-3 through N-3 are connected to the corresponding pole or common contacts I-c through N-c. A wire 94a connected to contact M-3 energizes an indicator lamp 95a. A wire 179 connects contact K-3 of switch H to a solenoid 180 (FIG. 8) which is connected, as by linkage 181 to a clutch 182 for causing the two cams 183 and 184 to rotate with Selector valve 12 and operate cam switches HH-1 and HH-2. Clutch 182 serves to mechanically connect a shaft 185, mounting cams 183 and 184, and shafting designated 186 and 187 powered by Geneva motion transmission G' which also powers sampling Selector valve 12 as well as three sets of single pole, multiple contact selector switches KK, LL and MM, synchronized with Selector valve 12. Thus, the pole contact of each of the last mentioned switches is electrically connected, sequentially, to its contacts, for instance, KK-1, KK-2, KK-3 . . . in synchronism with registry of selector valve arm 16 with sampling ports 14 thereof.

Figure 8:
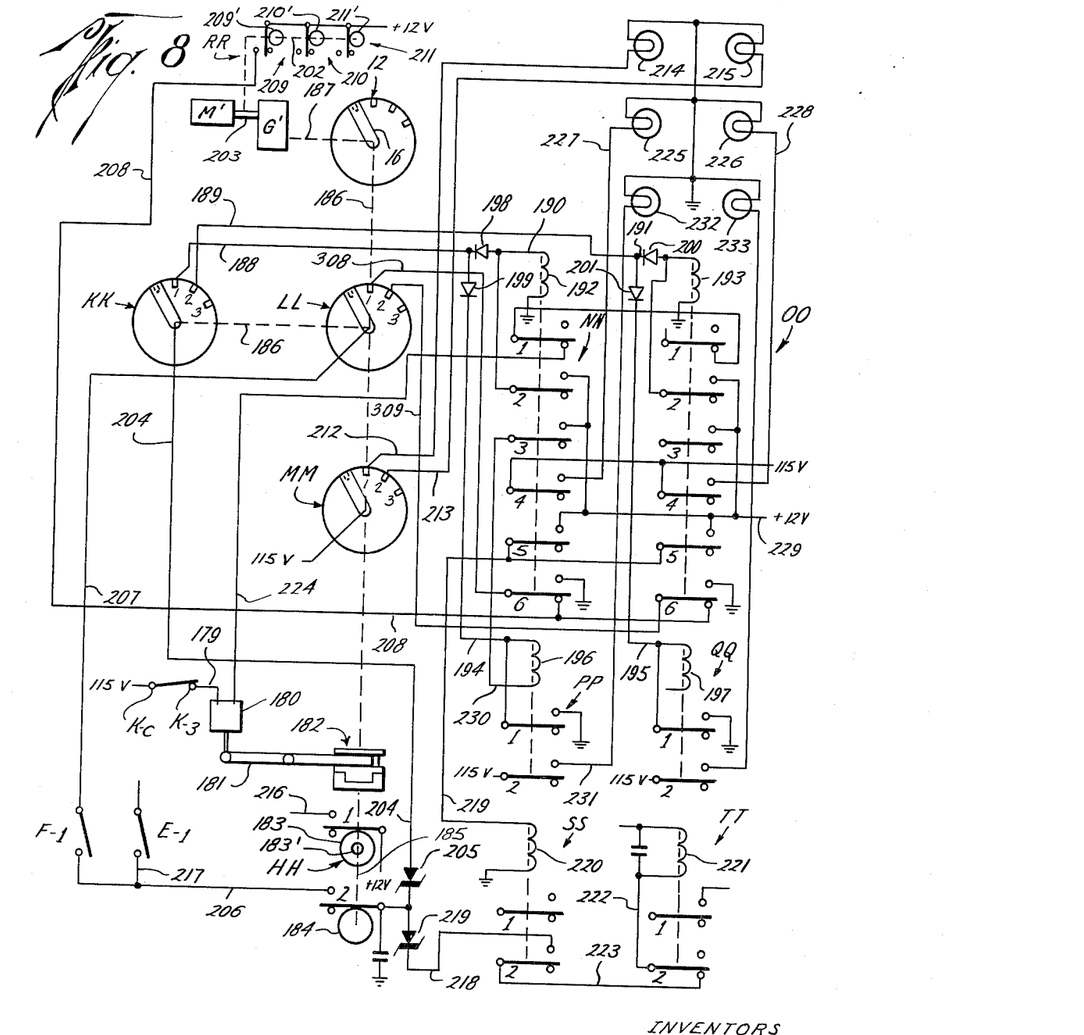
FIG. 8 schematically represents the parts and circuitry for shifting the apparatus to the "alarm" cycle and for registering conditions existing during such cycle.

The contacts of switch KK are connected by wires 188, 190 and 189, 191, etc., to the solenoids 192, 193, etc., of auxiliary low gas relays NN, OO . . ., one for each contact of switch KK. Contact wires 188, 189 . . . from switch KK are connected, also, by wires 194, 195 . . . to solenoids 196, 197 . . . of auxiliary high gas relays PP, QQ . . . . Diode semi-conductors 198 and 199 are provided, respectively, in connected wires 190 and 194 for polarizing the current flows therethrough, as will be explained. Similar diodes are provided, as at 200 and 201, in each set of branched wires connecting the remaining contacts of switch KK to corresponding auxiliary high and low gas sensing relays. The pole contact of rotary switch KK is connected by a wire 204 through a Zener type semi-conductor diode 205 to the pole contact of cam switch HH-2. Cam switch HH-2 closes shortly after clutch 182 is engaged. Normally open cam switch contact HH-2 is connected by a wire 206 to normally-open low and high gas sensing relay contacts E-1 and F-1. The pole contact F-1 is connected by a wire 207 to the pole contact of second rotary selector switch LL. The contacts of switch LL are connected by wires 208, 209 . . . to the pole contacts NN-6, PP-6, etc., of auxiliary low gas relays NN, OO, etc., in order. Normally open relay contacts NN-6, OO-6, etc., are grounded. Normally closed contacts NN-6, OO-6, etc., are all connected by a wire 208 to the normally open contact 209 of a second cam switch set RR. Switches 209, 210, and 211 are actuated by cams 209', 210', and 211' on a shaft 202 driven by shaft 203 connecting motor M' and gear box G' so as to be actuated continuously with the Selector valve 12.

Third rotary selector switch MM has its pole contact connected to a source of 115 volt A.C. current. The contacts of this switch are connected by wires as 212, 213, etc., to a series of lamps 214, 215, etc., which signal the position of the sampling selector valve at each moment.

Previously mentioned cam 183 is driven through gearing 183' to close its switch contacts HH-1 after twenty minutes, namely, several complete cycles of the sampling Selector valve 12 and switches KK, LL, and MM, to apply energy through a wire 216a (FIG. 2) and self-heating timer switch 216 to contact I-3 of Operation Selector switch H, thence to solenoid 64 for advancing switch H from "alarm" to "normal" position in case no indication of escaping gas is picked up by the selector valve during the twenty minute "alarm" period.

If a gas is encountered during the "alarm" cycle, current from a contact of Alarm Meter D will pick up either Low Gas relay E or High Gas relay F (FIG. 1). In case of a low gas showing, not considered immediately dangerous, normally open contact E-1 of Low Gas relay E, now closed, and wire 206 will supply current from positive D.C. supply 217 through now closed normally-open cam switch contact HH-2 and wire 204 containing semi-conductor 205 to the pole contact of rotary selector switch KK to energize, in turn, low gas relays NN, OO, etc., past semi-conductor diodes 198, 200, etc. Normally open contacts NN-5, OO-5, etc., as they close, direct 12 volt D.C. positive curent through a wire 219 to the solenoid 220 of an additional low gas sensitive relay SS. An additional high gas sensitive relay TT has its solenoid 221 energized through wires 222 and 223 breaking through its own pole and normally closed contacts TT-2 and the pole and normally open contacts SS-2 of relay SS to wire 218 including Zener semi-conductor diode 219. Upon actuation of any of relays NN, OO, etc., powering wire 224 is opened at one of the relay contacts NN-1, OO-1, etc., clutch 182 is disengaged, and cams 183 and 184 are stopped so that switch HH-1 will not be closed at the end of the normal twenty minute "alarm" period to shift Operation Selector switch H to normal or search position.

Actuation of one of the relays NN, OO, etc., also, will illuminate one of the low gas signal lamps 225, 226, etc., through its energizing wires 227, 228 and normally open relay contacts NN-4, OO-4, etc. These relays are self-holding through their normally open contacts NN-2, OO-2. . . .

In case of a high gas showing during the alarm cycle (FIG. 8), positive current will be applied from a source 229, through normally open and pole contacts NN-3, etc., and a wire 230 through high gas relay coil 196, thence through wires 194 and 190 and coil 192 to ground, semi-conductors 198 and 199 permitting this current flow. Normally open high gas relay contacts PP-2, QQ-2 . . . will energize one of the danger signal lamps 232, 233, etc. High gas relays PP, QQ, etc., are self-holding through their normally open contacts, as PP-1.

The danger indication will be held until a manual reset button symbolized at FF in FIGS. 6 and 9, is actuated. Contacts FF-2 of switch FF apply power through a wire 238 to the coil 239 of a two-pole reset relay UU and through normally open relay contact UU-1 to the actuating coil 240 of a four-pole reset relay VV. Closing normally open relay contacts UU–2, as described, acts through wires 238, 241, and 242, self-heating delay switch GG, and wire 215 connecting with Operation Selector terminal I–3 to energize coil 64 and shift switch H from position 3 to normal or search position 1.

Closing of Manual reset switch contacts FF–1 applies current through wires 117 and 119 to contact DD-c of stepper switch V, thence through tied contacts DD–2 or DD–3 to coil 107 causing return of switch V to its normal position.

Closing of contacts VV–3 of reset relay VV powers through wires 245 and 246 Reset motor 126 which is linked to perviously mention switch operating cams 183 and 184 in a manner to return these cams to their starting positions in which switches HH–1 and HH–2 are open.

*Changing filaments*

Now to revert the "test" cycle with stepper switch H (FIG. 2) in position 2, if the first fllaments are still not sufficiently sensitive after the stabilization step, Program motor 77 continues to run and cam switch P–6 is opened and cam switch P–7 is closed. As shown in FIGS. 1, 3 and 6, this acts to power solenoid 42 of Filament Change relay C through wire 115, tied contacts AA–2, AA–c, and W–c of stepper switch V, wire 108, switch 112, stepper switch contacts Z–c and Z–1, and wires 44 and 44a. The spare bridge A is now brought in circuit through the various normally open contacts of relay C (FIG. 1). At the same time, stepper switch V moves to position 2, Program motor 77 continues to run as relay 0 remains energized, repeating the test procedure, as outlined above, since Operation Selector switch H remains in the test (No. 2) position.

Figure 10:
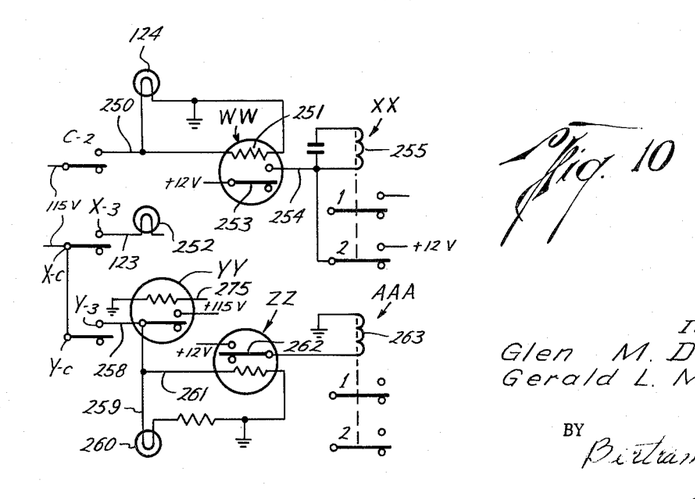
FIG. 10 shows the circuitry controlling certain filament conditions, and also illustrates the circuitry for signaling inoperative condition in case, for instance, the spare bridge cannot be balanced by the "zero servo" mechanism.

Also, when relay c is energized (FIG. 10), its normally open contact C–2, through a wire 250, energizes the coil 251 of a thermal relay WW and lamp 124 signaling trouble with the filaments of first Bridge B. Closing of contacts 253 of relay WW energizes, through a wire 254, the coil 255 of a relay XX, the contacts of which give further indications of service requirements.

If spare bridge A cannot be balanced by the zero servo mechanism (FIG. 4), or if it insufficiently sensitive after stabilization, or if the spare filaments should "burnout," as sensed by relay S, stepper switch V will be shifted to position 3 in which its contact X–3 will energize the filament A inoperative lamp 252 (FIGS. 6 and 10) by means of a wire 123. Closing of stepper switch contact Y–3 will act through wires 258 and 259 (FIG. 10) to energize an "inoperative" indicator lamp 260 and through a wire 261 to energize the coil of a thermal relay ZZ. Closing the contacts 262 of relay ZZ will energize the coil 263 of another "inoperative" relay AAA whose contacts are available for additional indications.

Under the above "inoperative" conditions, Operation Selector switch H remains in 'test' position so that a false alarm, dependent upon switch H being in "alarm" position (position 3) cannot possibly be given. Short of completion of the twenty minute 'alarm" cycle, without further gas show, returning of switch H from "test" to normal (No. 1) position can be effected only by actuation of Manual Reset button FF (FIGS. 6 and 9).

Figures 11, 12:
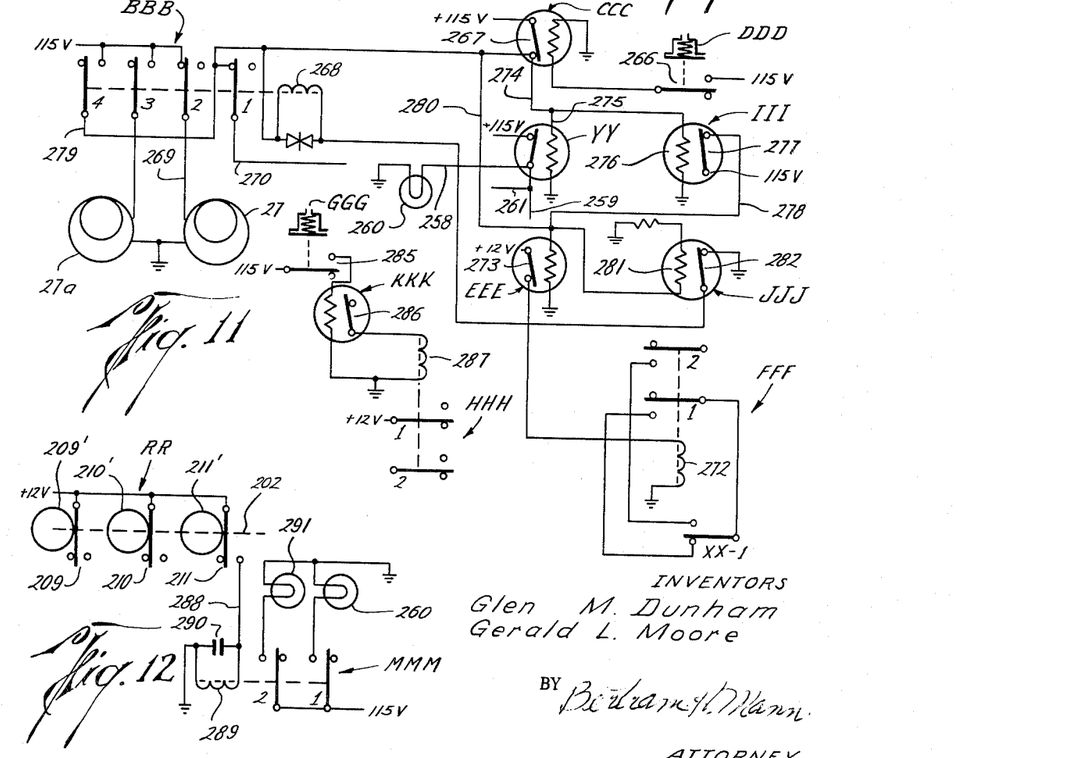
FIG. 11 illustrates the compressor condition indicating circuitry.
FIG. 12 represents the means for signaling the operative or inoperative condition of the selector valve and certain parts cooperating with the "zero" or bridge balanced meter.

FIG. 11 shows the compressor failure sensing circuits. In practice, a spare compressor 27a is provided in addition to first compressor 27. These circuits include a four-pole Compressor relay BBB and various thermal relays as shown. In the de-energized condition of relay coil 268 of relay BBB, normally closed contact BBB–2 will power compressor 27 through a wire 269. In case first compressor 27 fails to maintain proper vacuum in Selector Valve casing 13 (FIG. 1) the contacts 266 of vacuum switch DDD will open deenergizing the coil of a thermal relay CCC, permitting the contacts 267 thereof to close causing closing of contacts 277 of a thermal device III, through its coil 276, to apply current through wires 278 and 280 to energize Compressor relay coil 268. This, in turn, will cut off compressor 27 and power compressor 27a. Normally open contacts BBB–4 hold coil 268 energized through a wire 279. This contact also energizes, through a wire 280, the coil of a thermal relay EEE whose contacts 273, closing after a few seconds, energize the coil 272 of a two-pole relay FFF whose normally open and normally closed contacts provide signals as to the condition of the compressors. Closing of switch contacts 267 of thermal device CCC also energizes the coil of thermal switch YY, by means of wires 274 and 275 and previously mentioned lamp 260 indicating that compressor 27a is in operation. Closing of contacts 277 of thermal device III also energizes a coil 281 of a thermal device JJJ to open contacts 282. If the second compressor fails, contacts 266 of Vacuum switch DDD again close to power the coil of thermal switch CCC and, in turn, the coil of thermal switch YY which energizes "inoperative" indicator lamp 260 through a wire 261. The contacts of relay YY also power the coil of thermal relay ZZ through wire 261 (FIG. 10) to pick up relay AAA for providing auxiliary failure signals.

An additional safety feature is provided by suction switch device GGG (FIGS. 1 and 11) whose contacts 285 close when excessive vacuum exists in conduit 26, as when a sampling line is plugged. Closing of contacts 285 energizes the coil of a thermal switch KKK and through it the coil 287 of a two-pole relay HHH for indicating the sensed condition.

FIG. 12 shows the set of cams 209′, 210′, and 211′, all operated with a selector valve 12 and, respectively, actuating switches 209, 210, and 211. These switches close and reopen as each sampling port is covered and uncovered by rotor 16. The normally open contact of switch 211 is connected by a wire 288 to the coil 289 of a two-pole interrupter relay MMM. Condenser 290 paralleling coil 289 stores enough energy to hold the coil energized during normal operation of the Selector Valve. However, if the selector stops rotating, relay MMM will drop and normally closed relay contacts MMM–1 and –2 will energize, respectively, a Selector Trouble lamp 291 and previously mentioned inoperative lamp 260.

Cam switch 209 operates the clamper, not shown, of zero meter R for registering any bias of the bridge in circuit during the "zero'" test. Contacts 210 power the zero meter contacts. These details are not here shown as they are well known and are not necessary to an understanding of the invention.

The operation of the novel safety detection apparatus should be clear from the preceding description. However, the operation may be summarized as follows: Samples drawn from the various areas to be monitored are continuously applied to a gas detection filament. Once every twenty-four hours the system is subjected automatically to a test for operativeness, the same as if an apparent gas show were encountered. In case of a contaminant type response of the bridge in circuit, i.e., an unbalance thereof, which may be due to the presence of gas at one of the monitored areas, the machine proceeds to "test" position. To make the test, the detector filament in circuit is subjected to fresh air long enough to flush out the filament chamber and then the bridge is switched to the "zero" meter. If bridge unbalance is found to be present, such unbalance is due to differences in the geometry of the filaments. This difference, if not too great, is compensated by using a "zero" potentiometer. If the difference is too great for correction by the "zero" potentiometer, a spare filament is switched into the circuit. If this spare filament, still, cannot be "zeroed," a system "inoperative" signal is given. When new filaments are inserted, a Manual Reset button can be pushed to again initiate the test procedure.

In case the original or spare bridge can be properly "zeroed," this bridge is shifted back to the "alarm" meter and subjected to a quantity of a known combustible gas sample. If the filament is properly sensitive, as indicated on the alarm meter, the apparatus proceeds to "alarm" position. However, in case the filament is not properly sensitive, a higher than normal voltage is applied to the filaments in an effort to stabilize the same by burning off coatings which may be affecting the sensitivity. Following the stabilization step, the zeroing and known gas tests are repeated. If the original filaments cannot be properly stabilized, the spare filament is cut into the circuit and its bridge re-subjected to the zeroing and known gas and, if necessary, stabilization procedures. If the spare filament still is not properly sensitive, a system "inoperative" signal is given.

In the "alarm" position, which is reached when a filament has proven properly sensitive, the filament is again subjected, in turn, to samples from the areas being monitored. In case no gas show is now encountered during a twenty minute "alarm" period, the apparatus returns to the original or "search" position. However, in case of a further unbalance of the bridge in circuit during the "alarm" period a signal is given indicating low gas show at some particular point, which also is indicated, and another signal is given indicating high or dangerous gas concentration at some particular point.

Additional safety signals are provided indicating trouble at all other points where malfunctioning may occur. For instance, compressor trouble is automatically followed by a shift to a spare compressor and, then, to a system "service" signal. Trouble in the motor which operates the monitoring Selector Valve causes the giving of an "inoperative" signal. Blockage in any of the monitoring lines also causes an "inoperative" signal with an indication of its location. These signals, of course, may be directed to some central point, either near by or remote, where an operator may then take the necessary steps to correct the condition indicated.

The means for making the various tests and for transmitting various signals may be modified as will occur to those skilled in the art, and exclusive use of all modifications as come within the scope of the appended claims is contemplated.

We claim:

1. Apparatus for warning of atmospheric contamination comprising
   a device sensitive to atmospheric contamination,
   sampling means for exposing said device to atmosphere to be tested,
   test means for testing the integrity of said device,
   a warning signal,
   an operation selector having first, second, and third positions,
   means operatively connecting said device and said selector and responsive to contaminant indicating stimulation of said device, when said selector is in said first position, to shift said selector to said second position,
   means for operatively connecting said device to said test means through said selector when in said second position for testing the accuracy of response of said device and shifting said selector to said third position responsive to predetermined actuation of said test means, and
   means operatively connecting said device to said warning signal through said selector when in said third position for energizing said signal responsive to contaminant indicating stimulation of said device after verification of the integrity of said device.

2. Apparatus for testing atmosphere for contamination comprising
   a device sensitive to atmospheric contamination,
   test means for testing the integrity of said device,
   a warning signal,
   an operation selector having first, second, and third positions,
   a first electrical circuit connecting said device and said selector for shifting said selector from said first position to said second position responsive to contaminant indicating stimulation of said device,
   a second electrical circuit for connecting said device and said test means through said selector for automatically testing the integrity of said device in the second position of said selector and shifting said selector to said third position responsive to predetermined response of said test means, and
   a third electrical circuit connecting said device and said signal through said selector in said third position for energizing said signal responsive to contaminant indicating stimulation of said device in said third position of said selector.

3. Apparatus as described in claim 2 in which said test means includes means for subjecting said device to a known gas sample and reflecting the resultant stimulation of said device.

4. Apparatus as described in claim 3 in which said test means further includes zero meter means for indicating unbalanced condition of said device and said second electrical circuit includes means for connecting said zero meter means to said device for checking the normal, non-gas stimulated condition of said device.

5. Apparatus as described in claim 4 in which said test means further includes an alarm meter for measuring the known gas response of said device and also includes means for disconnecting said device from said zero meter means and connecting the same to said alarm meter responsive to predetermined response of said zero meter means.

6. Apparatus as described in claim 3 in which said test means further includes stabilizing means for applying relatively high current to said device for eliminating desensitizing film formed thereon.

7. Apparatus for testing for gas contaminanted atmosphere in a plurality of regions subject to gas leakage comprising
   a device sensitive to gas contaminated atmosphere,
   monitoring means for sequentially exposing said device to atmospheric samples from said regions,
   test means for testing the integrity of said device,
   warning signal means,
   an operation selector having switching means and powering means for shifting said switching means selectively to search, test, and alarm positions,
   a first electrical circuit connecting said device to said powering means,
   means for energizing said first circuit and said powering means when said switching means is in said search position to actuate said switching means to said test position,
   a second electrical circuit for connecting said device to said test means through said switching means when in said test position, for testing the integrity of said device,
   a third electric circuit for connecting said device to said powering means through said switching means when in said test position whereby predetermined response of said device to said test means shifts said switching means to said alarm position, and
   a fourth electrical circuit for connecting said device to said warning signal means through said switching means when in said alarm position and for energizing said warning signal means responsive to contaminant indicating stimulation of said device.

8. Atmospheric test apparatus as described in claim 7 in which said means for energizing said first circuit and said powering means include a timing device for insuring periodical testing of the integrity of said sensitive device.

9. Atmospherc test apparatus as described in claim 7 in which said means for energizing said first circuit and said powering means includes a part responsive to contaminant indicating stimulation of said sensitive device for causing automatic verification of the integrity of said sensitive device before said warning means is energized by said device.

References Cited by the Examiner
UNITED STATES PATENTS

| | | | |
|---|---|---|---|
| 1,707,624 | 4/29 | Brown | 73—27 |
| 2,034,281 | 3/36 | Buchholz. | |
| 2,118,837 | 5/38 | Felton. | |
| 2,473,314 | 6/49 | Toulon | 340—213 |
| 2,556,363 | 6/51 | Lord et al. | |
| 2,721,578 | 10/55 | Pouppirt | 73—23 XR |
| 2,763,853 | 9/56 | Grant | 340—214 XR |
| 2,950,396 | 8/60 | Schneider | 88—14 XR |
| 3,069,896 | 12/62 | Kindred | 73—23 |

NEIL C. READ, *Primary Examiner.*

UNITED STATES PATENT OFFICE
CERTIFICATE OF CORRECTION

Patent No. 3,209,343　　　　　　　　　　　　　　September 28, 1965

Glen M. Dunham et al.

It is hereby certified that error appears in the above numbered patent requiring correction and that the said Letters Patent should read as corrected below.

Column 4, line 24, for "power" read -- powers --; column 6, line 53, for "m-2" read -- P-2 --; column 7, line 17, for "m-5" read -- P-5 --; line 35, for "Operator" read -- Operation --; column 12, line 71, for "Atmospherc" read -- Atmospheric --.

Signed and sealed this 3rd day of May 1966.

(SEAL)
Attest:

ERNEST W. SWIDER　　　　　　　　　　　　　　EDWARD J. BRENNER
Attesting Officer　　　　　　　　　　　　　　Commissioner of Patents